CATHODE-RAY BEAM DEFLECTION CIRCUIT

Filed Dec. 26, 1946

INVENTOR
RICHARD C. WEBB
BY H. S. Grover,
ATTORNEY

Patented Feb. 28, 1950 2,499,080

UNITED STATES PATENT OFFICE 2,499,080

CATHODE-RAY BEAM DEFLECTION CIRCUIT

Richard C. Webb, Princeton, N. J., assignor to Radio Corporation of America, a corporation of Delaware Application December 26, 1946, Serial No. 718,292

4 Claims. (Cl. 315—27)

Figures 1, 2, 3, 4:
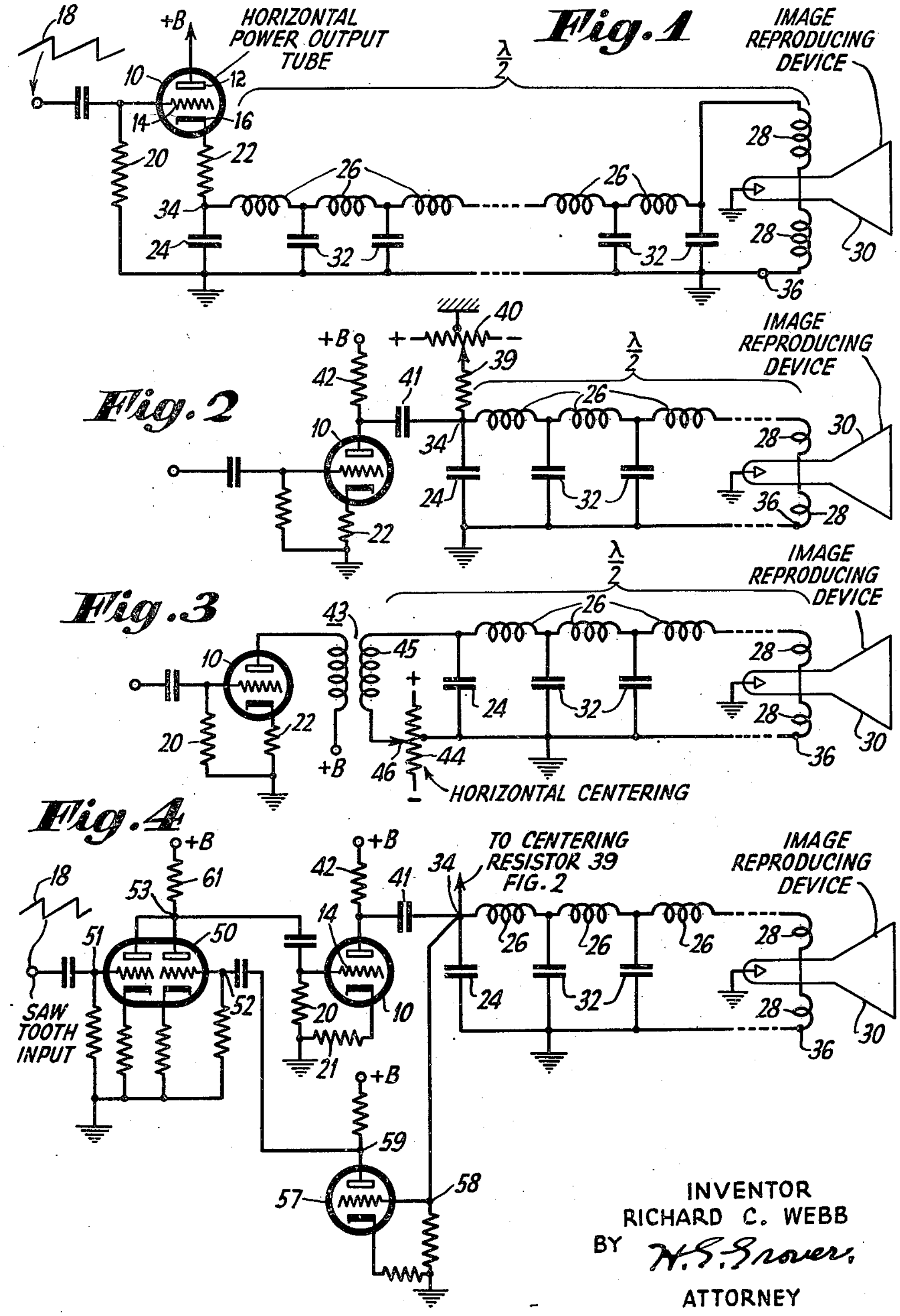

The present invention relates to television systems, and more particularly relates to a television system of the type in which the electron scanning beam of a cathode ray tube is electromagnetically deflected over a target area in a selected pattern.

It is customary in cathode ray beam deflection circuits, as employed in television systems of the above nature, to couple one or more horizontal, or line, power output tubes to a pair of horizontal cathode ray beam deflection coils through a step-down transformer. By controlling the waveform of the voltage variation applied to the grid of this power output tube or tubes, a cyclically varying current is caused to flow through the beam deflection coils a portion of each cycle of which varies in a substantially linear manner with respect to time. As a result, the cathode ray scanning beam is caused to traverse each line of the cathode ray tube target area at a substantially uniform rate, thus effecting the reproduction of an image which is substantially free from the distortion which frequently arises due to non-linearity of scan.

One of the features of such a circuit is that a relatively high voltage is developed across the coupling transformer. This voltage may be expressed mathematically as $$L\frac{di}{dt}$$

where L represents the inductance of the deflection circuit as it appears across the transformer, and $$\frac{di}{dt}$$

is the differential representing the rate of change of current through the transformer with respect to time. It is thus apparent that the developed voltage is a direct function of frequency, and presents a serious problem even at the present standard black-and-white television scanning frequency of 15,750 cycles per second. In high-definition black-and-white television, in which the image raster is composed of more than 525 lines, the transformer voltage which is thus induced tends to cause a marked reduction in the overall efficiency of the deflection circuit, and considerable power and a relatively high supply voltage are required to produce the desired horizontal movement of the cathode ray beam.

In tricolor television according to sequential methods, 180 separate component color fields, making 30 complete color frames double interlaced in 525 lines each, require a scanning frequency of approximately 47 kilocycles, and since only a limited reduction in the value of the circuit inductance may ordinarily be made, it will be apparent that the magnitude of the induced voltage may approach a very high level.

One serious effect of such high transformer voltages is that these voltages appear directly on the anode of the power output tube, or tubes, during the retrace, or snap-back, periods of the cathode ray beam. Thus, these power tubes must be constructed with a very high peak-inverse-voltage rating, which adds to their cost of manufacture. Furthermore, these inverse anode voltages make it extremely difficult to obtain accurate control over the current output of the tube, since they act to overcome, to a certain extent, the current-controlling action of the grid voltage. Consequently, not only need the tubes themselves be of specal construction, but also the grid driving voltage must be high, with extreme negative peaking during the retrace intervals. All of these factors increase circuit complexity and cost.

According to one of the principal features of the present invention, an electro-magnetic cathode ray beam deflection circuit, particularly suited for television systems, is provided in which no choke, transformer or other inductive coupling member is employed in shunt with the cathode ray beam deflection coils. Then, by utilizing the properties of a half-wavelength transmission line section interposed between the deflection coils and the power tube, the impedance into which the latter works may be reduced to a very low value, permitting an ordinary vacuum tube amplifier to be employed as the current generator. The latter may even operate class A, if desired. This mode of operation lowers circuit losses, and raises to a considerable degree the overall efficiency of the system, especially at the higher scanning frequencies.

One object of the present invention, therefore, is to provide an improved circuit for electromagnetically deflecting the electron scanning beam of a cathode ray tube.

Another object of the invention is to provide, in one modification, means whereby the choke or transformer which usually couples the power output tube of an electro-magnetic cathode ray beam deflection circuit to the beam deflection coils may be eliminated, and to further provide means whereby the peak inverse voltage developed across this power output tube may be held to a relatively low value, thereby permitting both the use of a lower cost tube and of a reduced grid driving voltage.

Other objects and advantages will be apparent from the following description of a preferred form of the invention and from the drawings, in which:

Fig. 1 is a schematic representation of a preferred form of the present invention; and Figs. 2, 3 and 4 illustrate modifications of the embodiment of Fig. 1.

Referring first to Fig. 1, there is shown a cathode ray beam deflection circuit including a horizontal (or line frequency) power output tube 10, which may be an ordinary vacuum tube amplifier. Tube 10 is provided with an anode 12, at least one control electrode 14, and a cathode 16. Anode 12 of tube 10 is connected as shown to a suitable source of operating potential, designated in the drawing as +B. The control electrode 14 of tube 10 has applied to it voltage variations which may have the sawtooth wave form indicated by the reference numeral 18. The usual grid resistor 20 is connected in a conventional fashion between the control electrode 14 of tube 10 and a point of constant potential.

A further resistor 22 has one of its terminals connected to the cathode 16 of tube 10. The other terminal of resistor 22 is connected to one plate of a condenser 24, the remaining plate of this condenser 24 being connected to ground or a constant-potential point.

Tube 10 is designed to act as a substantially linear amplifier. In other words, during operation of the circuit, application of the sawtooth voltage variation 18 to the control electrode 14 of tube 10 causes a current of the same substantially sawtooth wave form to flow in the anode-cathode circuit of tube 10. The direct current path between the anode and cathode of tube 10 includes, in addition to the resistor 22, a series of inductors 26, and a pair of horizontal cathode ray beam deflection coils 28. These cathode ray beam deflection coils 28 may, for example, comprise part of a yoke assembly encircling the neck of a cathode ray image-reproducing device, or kinescope, 30.

Connected respectively between each of the inductors 26 and ground is a series of condensers 32, these condensers 32 being effectively in shunt with the condenser 24. It will thus be seen that the inductors 26 and the condensers 32 together constitute a transmission line composed of a series of low-pass filter sections of the "constant-k" type connected between the horizontal power output tube 10 and the deflection coils 28. The impedance of each of the inductors 26 is made substantially equal to the impedance of the deflection coils 28, and the number of filter sections is so chosen that the total length of the transmission line composed of these filter sections is approximately a half-wavelength (or $$\frac{\lambda}{2}$$

in the drawing) between the points 34 and 36 at the fundamental operating frequency of the circuit. This latter frequency is the repetition frequency of the sawtooth voltage variation 18 which is applied to the control electrode 14 of tube 10.

Each of the filter sections formed by the series inductors 26 and shunt condensers 32 is thus in effect a section of artificial delay line. The values of these elements 26 and 32 is so chosen that the time-delay over the entire transmission line between the terminal points 34 and 36 is substantially constant between the fundamental frequency of the circuit (as determined by the repetition frequency of the input voltage 18) and approximately the tenth harmonic of this fundamental frequency. While in practice it is not feasible to hold this delay constant within a range of about 10%, nevertheless it has been found that any variation within this percentage does not have any detrimental effect on the operation of the circuit. By thus holding the time delay substantially constant up to the tenth harmonic of the fundamental frequency, the entire transmission line between the terminal points 34 and 36 will appear to be an integral number of half-wavelengths long to each such harmonic of the fundamental frequency.

Under the above conditions, the impedance looking into the transmission line from the point 34 will be relatively low, since the further end of the line is short-circuited at point 36 just beyond the end section comprising the cathode ray beam deflection coils 28. In other words, the voltage wave which is reflected from the short-circuited end of the transmission line at point 36 will arrive back at the input point 34 in proper phase to substantially neutralize the applied voltage.

In order to prevent secondary reflections from arising along the transmission line, the line is constructed so as to be substantially uniform over its entire length, as obviously any discontinuity in the line will cause such secondary reflections to be produced.

The impedance looking into the transmission line at point 34 is, as above stated, of relatively low value. This means that the line may be fed from the cathode circuit of the horizontal power output tube 10, and, due to the absence of high inverse voltages, tube 10 may be an ordinary vacuum tube amplifier operating class A.

Although the impedance looking into the transmission line at point 34 is very high at frequencies other than the fundamental operating frequency and its harmonics, this fact is not of importance, since only the latter frequencies need be supplied to the image-reproducing device 30.

While the artificial delay line composed of the inductors 26 and condensers 32 has been shown in Fig. 1 of the drawings as being connected in the cathode circuit of tube 10, it is permissible to connect this delay line in the anode circuit of the power output tube, if desired. Such an arrangement is shown, for example, in Fig. 2. Furthermore, in the event that it is desired to supply a centering current to the horizontal cathode ray beam deflection coils 28 to effect a horizontal centering of the image raster on the face of the tube, it is possible to use arrangements such as shown, for example, in Figs. 2 and 3. In Fig. 2 the centering current is introduced at point 34 through a suitably chosen resistor 39. Adjustment of the magnitude and direction of the current is accomplished by means of the center tapped control potentiometer 40 which is connected to an external source of steady direct current. An isolating condenser 41 is provided between the load resistor 42 of tube 10 and the centering resistor 39.

In Figure 3 a transformer 43 is used to couple the artificial delay line to the power output tube 10. A centering resistor 44 is also provided, the center tap of this resistor being connected to ground or a point of constant potential, and the ends of the resistor being connected in series with a steady direct current source, in the same manner set forth in Fig. 2. By connecting the lower end (in the drawing) of the secondary winding 45 of transformer 43 to an adjustable tap 46 on this centering resistor 44, an adjustable direct current may be caused to flow through the cathode ray beam deflection coils 28. The circuit of Fig. 3, including the inductors 26 and condensers 32 is, in all other respects, similar to the circuit of Fig. 1 described above.

If the artificial delay line extending between points 34 and 36 in the circuits of Figs. 1, 2 and 3 were perfect (as might be the case, for example, if it were a transmission line having uniformly distributed constants), then there would be one reflection only taking place at the short-circuited end of the line, and the results obtained would be substantially as set forth above. However, in an artificial line consisting of a finite number of sections, each composed of lumped parameters, it will be found that a small amount of energy is reflected back from each one of the sections. These multiple reflections, although small in magnitude, appear as a ripple superimposed on the sawtooth current flowing through the deflection coils 28, and if not removed would cause the cathode ray beam of tube 30 to be deflected in a non-linear manner, thereby resulting in image distortion.

One means for overcoming such a voltage ripple is shown in Fig. 4, in which two tubes 50 and 57 have been added to the circuit of Fig. 2. Tube 50 is preferably of the double-triode type, having two input grid circuits 51 and 52. The two anodes of tube 50, however, are connected to a common point 53, which in turn is connected to a source of positive operating potential through the load resistor 61.

The output of tube 50 at point 53 is applied to the control electrode 14 of tube 10 (see Fig. 2). Hence, it will be seen that the two input grid circuits 51 and 52 of tube 50 provide independent input paths to the power output tube 10.

Tube 57 serves mainly as a phase inverter, although it may be arranged to act as an amplifier if desirable or necessary. The grid 58 of tube 57 is connected to the input terminal 34 of the artificial delay line described in connection with Fig. 1. The output of tube 57 at point 59 is applied to one of the input grids (52 in Fig. 4) of tube 50. The sawtooth input wave (18 in Fig. 1) is applied to the remaining grid of tube 50, in this case the grid 51.

It will now be seen that when the reflections from the filter sections make their appearance as a voltage ripple at point 34, these voltage variations are inverted in polarity by the tube 57 and applied to the grid circuit of tube 50. In tube 50, the phase-inverted voltage variations are added to, or mixed with, the sawtooth input voltage. Thus, any tendency for a positive (say) ripple potential to exist at point 34 is counteracted by a change in the form of the input voltage applied to the control electrode 14 of the power output tube 10. It has been found in practice that the resulting elimination of ripple voltage at the input terminal 34 of the transmission line results in a similar elimination of current ripple in the deflection coils 28.

The circuit of Fig. 4 thus in effect acts as a voltage regulator in which the voltage at point 34 is maintained constant by varying the characteristics of the sawtooth input wave 18.

While the individual low-pass filter sections made up of the inductors 26 and condensers 32 have been described as preferably being of the "constant-k" type, it will be understood that other suitable types of artificial delay line sections may be substituted therefor, if desired, without departing from the spirit of the invention. These line sections might consist, for example, of filter sections of the "m-derived" type, and the configuration might be either "lattice," or "ladder." Also, the transmission line might be constructed to have uniformly distributed constants.

I claim:

1. In a cathode ray beam deflection system having a deflection coil, the combination comprising, a source of deflection voltage, a coupling network connected between said source of deflection voltage and the deflection coil, said coupling network comprising a finite number of filter sections incorporating lumped parameters so proportioned to present to said deflection voltage source a terminating impedance partially simulating a transmission line, means for detecting any undesirable residual energy reflections in the coupling network due to the finite number of component filter sections, means for inverting the phase of the residual of energy reflections and means for combining the inverted reflections with the energy applied to the deflection coil whereby to reduce the influence of said reflections on the current flowing through the deflection coil.

2. In a cathode ray beam deflection system having a deflection coil, the combination comprising, a source of deflection voltage, a coupling network connected between said source of deflection voltage and the deflection coil, said coupling network comprising a finite number of filter sections incorporating lumped parameters so proportioned to present to said deflection voltage source terminating impedance partially simulating a transmission line having an electrical length equal to half the wave length of the fundamental frequency component of said deflection voltage, means for detecting any undesirable residual energy reflections in the coupling network due to the finite number of component filter sections, means for inverting the prase of the residual of energy reflections, and means for combining the inverted reflections with the energy applied to the deflection coil whereby to reduce the influence of said reflections on the current flowing through the deflection coil.

3. In a cathode ray beam deflection system, utilizing a deflection coil the combination comprising, an electron discharge device having at least an anode and a control electrode, a source of deflection voltage variations, means coupling the deflection voltage source to said electron tube control electrode, coupling from the anode circuit of said electron tube to the deflection coil, said coupling including a network comprising a finite number of filter sections having lumped parameters so proportioned to present a terminal impedance partially simulating a transmission line having an electrical length equal to one-half the wave length of the fundamental component of said deflection voltage variations, a connection with said coupling for detecting energy reflections in said network, means including an electron tube for inverting the phase of the energy reflections so detected, and means coupled with said inverting means for degeneratively applying said inverted energy reflections to said electron discharge device whereby to reduce the influence of said reflections on current flowing through the deflection coil.

4. In an electric wave utilization apparatus, a source of periodically recurrent electric waves, said waves representing the summation of a fundamental frequency component and a series of harmonically related components, a passive linear network comprising a finite number of filter sections having lumped parameters so proportioned to present a network terminal impedance simulating in part that of a transmission line having an electrical length of half the wave length of said electric wave fundamental component, a utilization apparatus connected with the output of said network, means connected with said source of electric waves for applying said wave to the input of said network, means for detecting undesirable residual energy reflections within the coupling network due to the discontinuities presented by the finite number of component filter sections, means for inverting the phase of the residual energy reflections so detected, and means for degeneratively combining the inverted reflections with the energy applied to said utilization apparatus whereby to reduce the influence of said reflections on the operation of said utilization apparatus.

RICHARD C. WEBB.

REFERENCES CITED

The following references are of record in the file of this patent:

UNITED STATES PATENTS

| Number | Name | Date |
|---|---|---|
| Re. 21,400 | Blumlein | Mar. 19, 1940 |
| 2,149,077 | Vance | Feb. 28, 1939 |
| 2,299,571 | Dome | Oct. 20, 1942 |
| 2,350,069 | Schrader et al. | May 30, 1944 |
| 2,414,546 | Nagel | Jan. 21, 1947 |